(12) United States Patent
Medvedovsky et al.

(10) Patent No.: US 12,483,591 B2
(45) Date of Patent: Nov. 25, 2025

(54) DETECTION AND MITIGATION OF UDP-BASED DDOS ATTACKS

(71) Applicant: Radware Ltd., Tel Aviv (IL)

(72) Inventors: Lev Medvedovsky, Netanya (IL); Gabi Nakibly, Tel Aviv (IL); David Aviv, Tel Aviv (IL)

(73) Assignee: Radware Ltd., Tel Aviv (IL)

( * ) Notice: Subject to any disclaimer, the term of this patent is extended or adjusted under 35 U.S.C. 154(b) by 109 days.

(21) Appl. No.: 18/523,341

(22) Filed: Nov. 29, 2023

(65) Prior Publication Data

US 2025/0175495 A1 May 29, 2025

(51) Int. Cl.
*H04L 9/40* (2022.01)
*G08B 21/18* (2006.01)
*H04L 69/22* (2022.01)
*H04W 8/00* (2009.01)

(52) U.S. Cl.
CPC ........ *H04L 63/1458* (2013.01); *G08B 21/182* (2013.01); *H04L 63/1408* (2013.01); *H04L 69/22* (2013.01); *H04W 8/005* (2013.01)

(58) Field of Classification Search
CPC .......................... H04L 63/1408; H04W 8/005
See application file for complete search history.

(56) References Cited

U.S. PATENT DOCUMENTS

| 2014/0211659 A1* | 7/2014 | Abraham | H04W 8/005 370/254 |
| 2021/0194894 A1* | 6/2021 | Anderson | H04L 63/1408 |

* cited by examiner

*Primary Examiner* — Barbara B Anyan
(74) *Attorney, Agent, or Firm* — M&B IP Analysts, LLC

(57) ABSTRACT

A method and system for detecting a denial of service (DoS) attack when packets used in the DoS attack are user datagram protocol (UDP) packets, are disclosed. The method includes obtaining values from an application header of a UDP packet; and when, based on use of at least one modified probabilistic Bloom filter (PMBF) for a destination to which the UDP packet indicates that it is destined, the obtained values are not values expected to be found in a UDP packet destined for the destination: increasing an uncommon per sample (ups) estimate for the PMBF; and when the increased uncommon per sample estimate is greater than an upper ups threshold: setting an alarm state to on; suspending update of the PMBF counters; and initiating a mitigation action at least with respect to the UDP packet.

20 Claims, 7 Drawing Sheets

DETECTION AND MITIGATION OF UDP-BASED DDOS ATTACKS

TECHNICAL FIELD

This invention relates to cybersecurity, and more specifically, to defending against user datagram protocol (UDP)-based distributed denial of service (DDoS) attacks.

BACKGROUND

Denial of service (DoS) and DDoS attacks attempt to overwhelm a target with a large number of packets to process so as to slow processing by, or disable, the target. When the packets used in the attack are UDP packets, such an attack is considered to be a UDP-based DoS or DDoS attack. Such attacks are detrimental to the target and the users being serviced by the target.

It is therefore desirable to be able to mitigate or defend against such attacks so that the target is not disabled during the attack and may continue to provide good service to its users.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include obtaining values from an application header of an UDP packet. Method may also include when, based on use of at least one modified probabilistic Bloom filter (PMBF) for a destination to which the UDP packet indicates that it is destined, the obtained values are not values expected to be found in an UDP packet destined for the destination: increasing an uncommon per sample (ups) estimate for the PMBF; and when the increased uncommon per sample estimate is greater than an upper ups threshold: setting an alarm state to on; suspending update of the PMBF counters; and initiating a mitigation action at least with respect to the UDP packet. Other embodiments of this aspect include corresponding computer systems, apparatus, and computer programs recorded on one or more computer storage devices, each configured to perform the actions of the methods.

In one general aspect, device may include one or more processors configured to: obtain values from an application header of an UDP packet; and when, based on use of at least one modified probabilistic Bloom filter (PMBF) for a destination to which the UDP packet indicates that it is destined, the obtained values are not values expected to be found in an UDP packet destined for the destination. Device may also include increase an uncommon per sample (ups) estimate for the PMBF. Device may furthermore include when the increased uncommon per sample estimate is greater than an upper ups threshold: set an alarm state to on suspend update of the PMBF counters; and initiate a mitigation action at least with respect to the UDP packet. Other embodiments of this aspect include corresponding computer systems, apparatus, and computer programs recorded on one or more computer storage devices, each configured to perform the actions of the methods.

DETAILED DESCRIPTION

Figure 1:
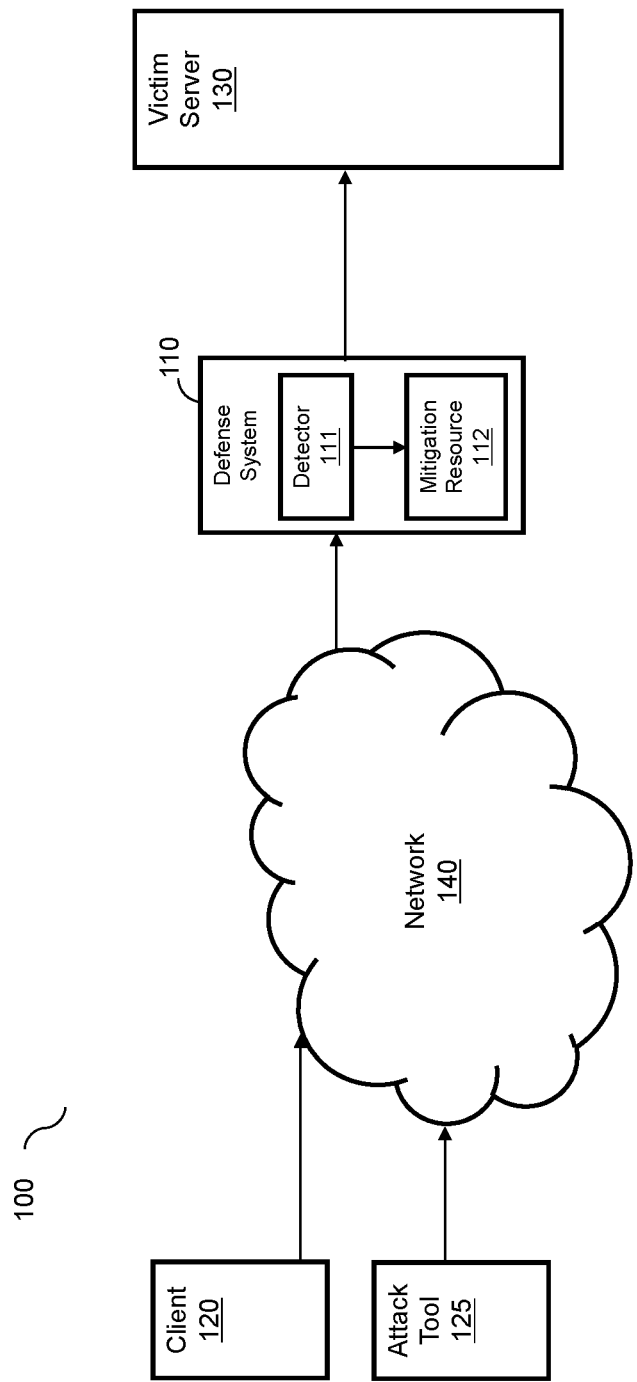
FIG. 1 shows a defense system for detecting and mitigating UDP-based DoS or DDoS attack in a network infrastructure, in accordance with the principles of the disclosure.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In accordance with the principles of the disclosure, as part of a learning phase during peacetime, i.e., when there is known to be no attack, the application header of UDP payloads are analyzed to determine the probability of the presence of certain numbers being at certain locations within the application header. These numbers and associated probabilities are recorded. The expected numbers at particular locations may be employed during a testing phase as a whitelist for packets, e.g., as a sort of fingerprint for non-attack packets, in that when an arriving packet contains numbers at particular locations that conform to the learned values, this indicates that the arriving packet is likely not an attack packet and as such that packet is allowed to proceed to its destination. When an arriving packet contains numbers at particular locations that do not conform to the known values, this may indicate that the arriving packet is likely an attack packet. When an alarm state is in effect, for an arriving packet that does not conform to the known values, a mitigation action is taken with respect to the packet, e.g., the packet is not allowed to proceed to its destination. If an alarm state is not in effect, then the ALARM state is switched off, it is used for updating PMBF and allowed to proceed to its destination. In other words, in the testing phase, the disclosed system is configured to inspect the numbers appearing at specified locations in each incoming UDP packet application header and compares the numbers detected at such positions with the numbers expected to be in the application header at such positions as was determined during the initial learning phase. Learning may also continue during the testing phase. In an embodiment, when the numbers in the application header at the particular locations completely conform to the expected numbers at such positions, the disclosed system is configured to allow to packet proceeds normally toward its intended destination. That is, this allows attack packets to be filtered out while non-attack packets can proceed normally. In an embodiment, PMBF is a pre-trained PMBF that was trained during an initial learning phase as to which values are expected to be found in particular locations of a UDP packet destined for the destination.

FIG. 1 shows an example defense system 110 deployed in a network infrastructure 100 for detecting and mitigating UDP-based DoS or DDoS attack in network infrastructure 100, in accordance with the principles of the disclosure. In an embodiment, network infrastructure 100 may include a defense system 110, a client device 120, an attack tool 125, a victim server 130, and a network 140. Client device 120 and attack tool 125 communicate with server 130 over network 140.

Client device 120 is a legitimate client, e.g., operated by a real user, and thus the traffic therefrom is legitimate traffic. Client device 120 may be, but is not limited to, a personal computer, a laptop, a tablet computer, a smartphone, a wearable computing device, or any other legitimate client device.

Attack tool 125 is an attack tool, e.g., operated by a bot, while the server 130 is a "victim server", i.e., a server under attack by attack tool 125. Attack tool 125 carries out malicious attacks against the victim server 130, and particularly UDP-based denial of service (DoS) attacks, which may be part of a DDoS attack. If the attack is a DDoS attack, there may be other attack tools, not shown in FIG. 1, that act similar to attack tool 125 and contribute to the attack in terms of generating UDP packets that are not legitimate traffic but are there for the purpose of being part of the attack. For simplicity of exposition, the attack will generally be referred to herein as a DoS attack, but it should be recognized that such reference includes the possibility of the attack being the more specific DDoS.

Thus, it should be noted that the principles disclosed herein are applicable when multiple attack tools execute either individually or concurrently in cooperation, an attack against victim server 130. Advantageously, the embodiments disclosed herein may be used to detect and mitigate a large-scale attack campaign where a vast number of attack tools participate in attacking the protected entity, i.e., the victim server 130. Similarly, a vast number of legitimate client devices 120 may operate concurrently to be provided with services provided by server 130. Both client device 120 and attack tool 125 may supply UDP packets to victim server 130 concurrently.

In view of the foregoing, it should be appreciated that although only one client device 120, one attack tool 125, and one victim server 130 are depicted in FIG. 1 such is merely for the sake of simplicity of exposition and that the principles disclosed herein may be applied to a plurality of client devices, attack tools, and servers.

When there are multiple client devices 120, they each may be located in different geographical locations. Similarly, when there are multiple victim servers 130, they each may be located in different geographical locations. Servers, such as victim server 130, may be part of one or more datacenters, server frames, private cloud, public cloud, hybrid cloud, or combinations thereof.

Attack tool 125 can be a dedicated tool for performing the UDP-based DoS or DDoS attack. In this regard, attack tool 125 may be a dedicated device or operating from an infected device that is coopted to be part of the attack. Attack tool 125 may employ any software that generates UDP packets. Note that attack tool 125 is not part of the solution of this disclosure. Rather, it represents the source of the problem to be solved by this disclosure.

Network 140 may be, but is not limited to, a local area network (LAN), a wide area network (WAN), the Internet, a cellular network, and a metropolitan area network (MAN), wireless network, IoT network, or any combination thereof.

Defense system 110 may be deployed in-line between a source of UDP packets such as client 120, and attack tool 125, and victim server 130. The processed traffic, which may include attack traffic, is then transferred to its destination, e.g., victim server 130. Defense system 110 and victim server 130 may, but need not, be deployed in a cloud computing platform and/or in an on-premise deployment, and they may, but need not, be collocated. When not collocated, routing paths are set in the usual manner to ensure that any traffic intended for victim server 130 is first routed to defense system 110. When deployed in a cloud computing platform, such cloud computing platform may be, but is not limited to, a public cloud, a private cloud, or a hybrid cloud. Example cloud computing platforms include Amazon® Web Services (AWS), Cisco® Metacloud, Microsoft® Azure®, Google® Cloud Platform, HP® Cloud, and the like. In an embodiment, when installed in the cloud, the defense system 110 may operate in the manner of software as a service (SaaS).

In some embodiments, defense system 110 includes detector 111 and mitigation resource 112. Detector 111 is configured to inspect packets destined for victim server 130, such packets having originated at a legitimate traffic source or an attacker, e.g., at client device 120 or attack tool 125. Detector 111 is arranged to detect UDP-based DoS attacks.

Mitigation resource 112 is configured to perform one or more mitigation actions when commanded to do so by detector 111 in order to mitigate a detected attack. In one embodiment, mitigation resource 112 may be a scrubbing center. A mitigation action may include, for example, reporting on a detected attack, limiting the traffic from a source, e.g., client device 120 or attack tool 125 to victim server 130, e.g., rate limiting the traffic, blocking the traffic completely, challenging the traffic source to prove it is a legitimate source, e.g., through use of a completely automated public Turing test to tell computers and humans apart (CAPTCHA), redirecting the traffic to another device capable of cleaning malicious traffic, and so on. The action is performed against traffic originating from any device determined to likely be part of an attack.

Victim server 130 is the entity to be protected from malicious threats, i.e., UDP-based DoS attacks. Victim server 130 may be a physical or virtual entity, e.g., virtual machine, a software container, a serverless function, and the like. For example, victim server 130 may be a WEB server, e.g., a server under attack, a WEB application under attack, an API server under attack, and so forth. The communication with victim server 130 is in the form of UDP packets.

Defense system 110 is configured to inspect traffic bound for victim server 130 from both client device 120 and attack tool 125. More specifically, the traffic is analyzed to determine abnormal activity based on the criteria described hereinbelow.

Figure 2:
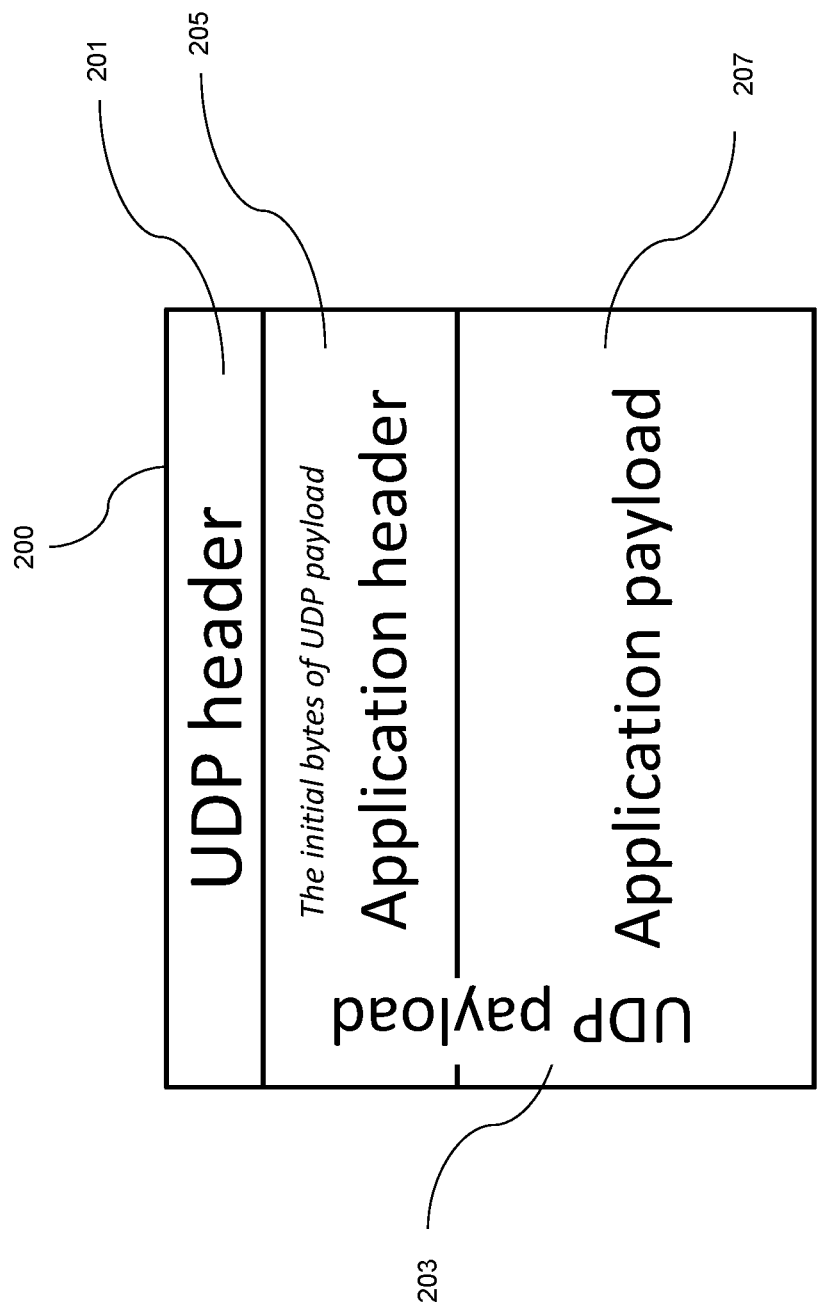
FIG. 2 shows the structure of conventional UDP packet.

FIG. 2 shows the structure of conventional UDP packet 200. UDP packet 200 comprises two parts, UDP header 201 and UDP payload 203. UDP header 201 may include source port and destination port fields that identify the end points of the connection, a length field that specifies the length of the header and data, and a checksum field that allows packet integrity checking. UDP payload 203 further includes two parts, application header 205 and application payload 207. Application header 205 is made up of the initial bytes of UDP payload 203. These bytes typically provide information about the data contained in the application payload. More specifically, application header 205 is application dependent. In this regard, applications are associated with specific ports, where a port is a specific number that tells the packet recipient to where the packet should be directed. There are certain port numbers that have a generally recognized standardized number and purpose and a system administrator may also set up ports for specific applications. As such, at least some of the initial bytes of the UDP payload belong to a limited, port-dependent set.

As noted above, denial of service (DoS) and DDoS attacks attempt to overwhelm a target with a large number of packets to process so as to slow processing by, or disable, the target. The instant disclosure takes advantage of the fact that the local assignment of applications to ports is typically unknown to such attackers. More specifically, the attack tools used to carry out such an attack, such as attack tool 125, do not craft UDP packets in the same manner as such packets are crafted when used by legitimate applications. Thus, in accordance with the principles of the disclosure, it is possible to distinguish between legitimate traffic and attack traffic by determining whether or not the contents of the UDP payload application header conform to the expectations for legitimate traffic.

This may be done, in accordance with the principles of the disclosure, by grouping certain bits of the application header together to form unsigned integer numbers (as a non-limiting example 16-bit unsigned integer) and determining during learning phase the statistics for the appearance of each number and combinations of the numbers at particular locations in the UDP application header. This analysis is done on a per-destination basis, where a destination is a combination of destination IP address or an IP subnet and at least one port, so that there is a set of statistics for each destination. The destination port number is specified in the UDP header. At this point, it should be remembered that, while a port is a number associated to a network protocol that receives or transmits communication for a specific service, the contents of the application header is application dependent. This results in the fact that at least some of the initial bytes of a legitimate, e.g., from client 120 and not attack tool 125, UDP payload, i.e., part of the application header, belong to a limited, port-dependent set of values. Taking this into account, defense system 110 is able to defend against an attacker that does not know or understand the statistics for the port or has not taken the effort to specifically craft an attack against the port with the statistics thereof in mind.

For example, the first 8 bytes of the application header may be grouped in pairs to form four 16-bit unsigned integer. This may be done by grouping the first 2 bytes, i.e., bytes 1 and 2 of the application header into one number, with the $1^{st}$ byte being the most significant bits (MSBs) and the $2^{nd}$ byte being the least significant bits (LSBs) of the number. Similarly, grouping the next 2 bytes, i.e., the $3^{rd}$ and $4^{th}$ bytes of the application header into one number, with byte 3 being the MSBs and byte 4 being the LSBs of the number, and so forth for the remaining 4 bytes. Thus, more generally, bytes, or even bits, at various specified locations or positions within the application header may be grouped to form arbitrary n-bits sets presenting n-bit integers, where n is chosen at the discretion of the implementer.

The statistics for each of the various ports are collected during peacetime by examining multiple packets destined for a particular destination. A sufficient number of packets, several hundred per destination (e.g., 100000), should be examined to be certain that the statistics fairly represent the nature of the traffic. For example, in one illustrative implementation, 427538 packets destined for 2133 different destinations were collected, with an average of about 200 packets per destination.

Figure 3:
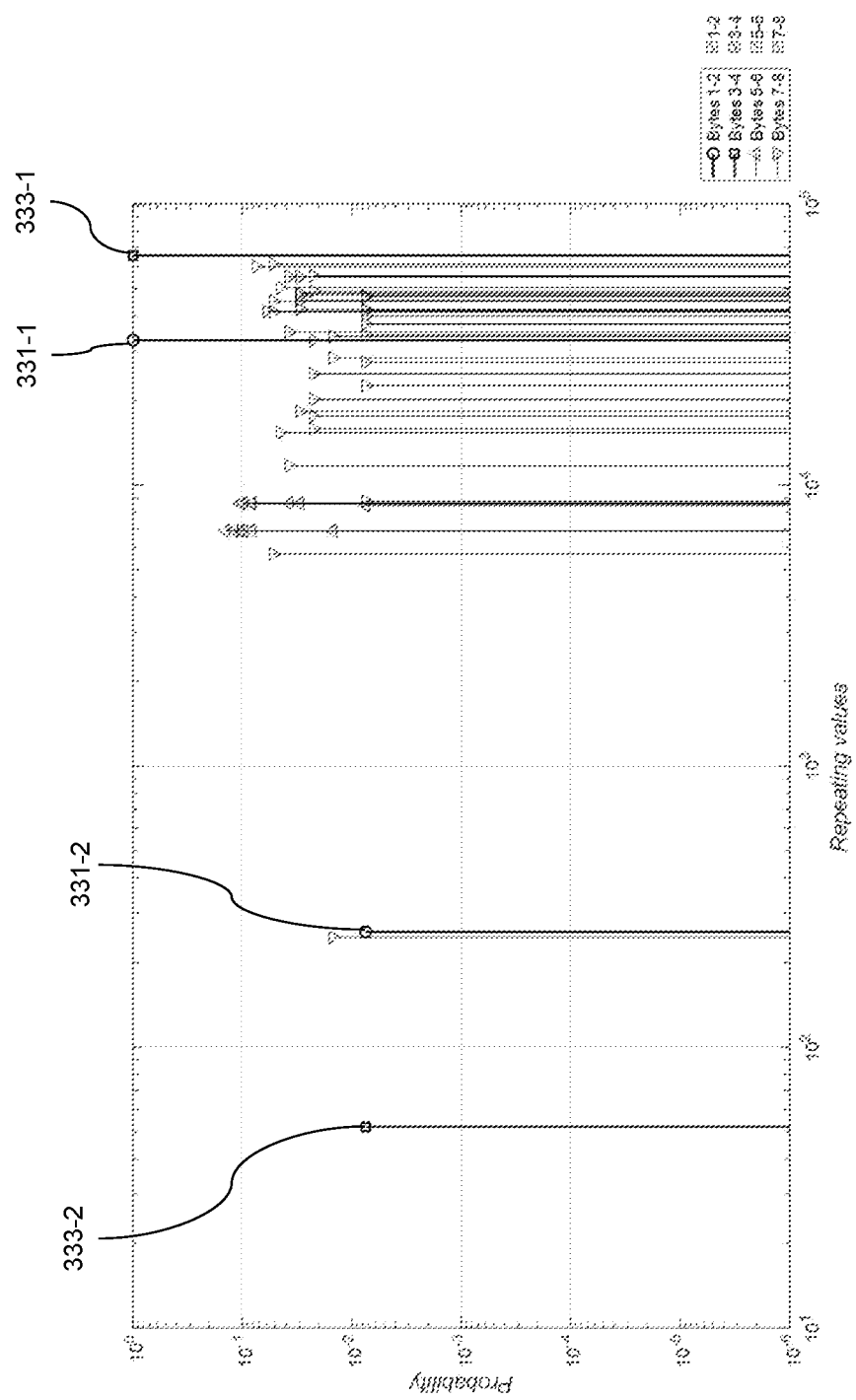
FIG. 3 shows an illustrative graph indicating the probabilities of a value repeating in the different number positions for a particular port.

FIG. 3 shows an illustrative graph indicating the probabilities of repeating values formed in four different locations of the application header of UDP packets—the first 4 bytes-pairs, for a destination IP and a particular port, e.g., destination subnet 1xx.xx.1.0/24 and port 20255 based on about 200 packets. The probability values are along the Y-axis for particular values which are along the X-axis. Both axes employ a logarithmic scale. In a general embodiment, the process of obtaining values from an application header of a UDP packet includes grouping 'b' bits of a UDP payload into 'b/2' bytes-pairs, where the bytes-pairs are formed by a bitmask process. Note that the application header of the UDP packet is the UDP payload.

From FIG. 3, it can be seen that there were observed 2 unique values 331-1 and 331-2 that are expected to appear in the value formed by bytes 1 and 2 of the application header, with the value of 32767 corresponding to 331-1 expected to appear approximately 99.25% of the time and the value of 257 corresponding to 331-2 expected to appear approximately 0.75% of the time. Similarly, it can be seen that there are 2 unique values 333-1 and 333-2 that are expected to appear in the value formed by bytes 3 and 4 of the application header, with the value of 65535 corresponding to 331-1 expected to appear almost approximately 99.25% of the time while the value of 52 corresponding to 333-2 expected to appear approximately 0.75% of the time. It can also be seen that there are 13 unique values that are expected to appear in the value formed by bytes 5 and 6 of the application header, while there are 37 unique values that are expected to appear in the value formed by bytes 7 and 8 of the application header.

After performing this analysis, when a UDP packet destined for this destination IP and port has the expected values in the expected positions, the packet may be determined to be a legitimate packet. Thus, the set of unique values and their expected positions, when the set is relatively small, e.g., less than 10 values, may be used as a whitelist to pass packets as legitimate when they have the expected values in the expected positions. This is especially true when the high probability unique values 331-1 and 333-1 are present. However, received packets that do not have the set of values in the expected positions, especially when the high probability unique values 331-1 and 333-1 are not present, may be determined to be illegitimate attack traffic and ultimately rejected.

Figure 4:
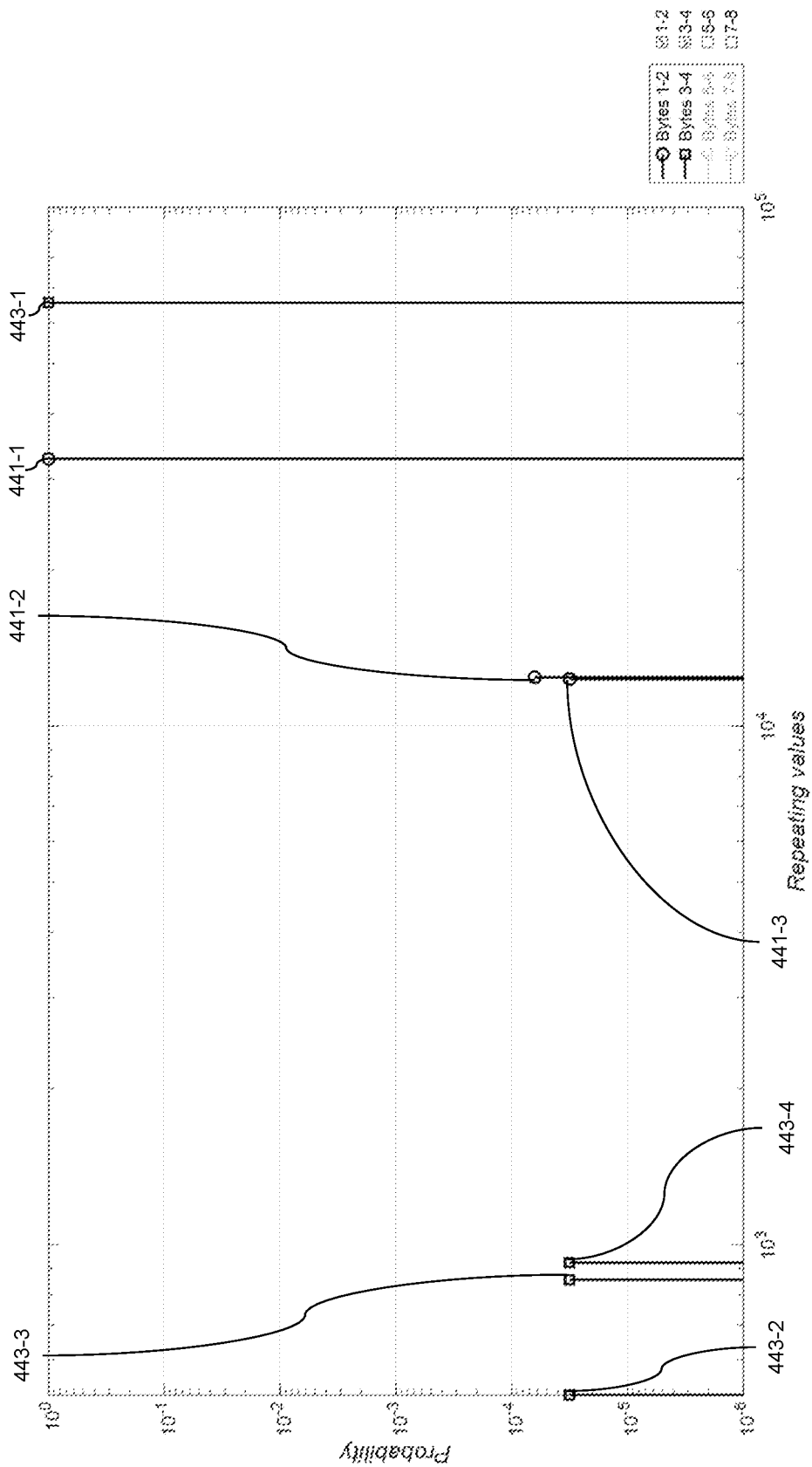
FIG. 4 shows another illustrative graph indicating the probabilities of a value repeating amongst the different number positions for a different particular port.

FIG. 4 shows another illustrative graph indicating the probabilities of a value repeating amongst the different number positions for a different destination IP and a particular port, e.g., destination subnet 1xx.xxx.xx.0/24 and a port range of 10000 to 40000 based on 31531 records (not all destination IP addresses of the subnet and ports of the range were actually used). The probability values are along the Y-axis for particular values which are along the X-axis. Again, both axes employ a logarithmic scale.

From FIG. 4, it can be seen that there are 3 unique values 441-1, 441-2, and 441-3 that are expected to appear in the value formed by bytes 1 and 2, with the value of 32767 corresponding to 441-1 expected to appear approximately 99.99% of the time, the value of 12418 corresponding to 441-2 expected to appear approximately 0.006% of the time, and the value of 12329 corresponding to 441-3 expected to appear approximately 0.003% of the time. Similarly, it can be seen that there are 4 unique values 443-1, 443-2, 443-3, and 443-4 that are expected to appear in the value formed by bytes 3 and 4, with the value of 65535 corresponding to 443-1 expected to appear approximately 99.99% of the time, the value of 513 corresponding to 443-2 expected to appear approximately 0.003% of the time, the value of 856 corresponding to 443-3 expected to appear approximately 0.003% of the time, the value of 924 corresponding to 443-4 expected to appear approximately 0.003% of the time. Not shown are the values formed by bytes 5 and 6, which span 521 unique values and the values formed by bytes 7 and 8, which form 9572 unique values. Given the large number of unique values for bytes 5 and 6 and 7 and 8 the values in these bytes can effectively be ignored. In fact, the values 441-3, 443-2, 443-3 and 443-4, which have very low probability of occurrence, can be neglected. Moreover, it is necessary to consider only those of the most frequent unique values whose minimum sum of probabilities is sufficiently close to 100%. For example, there is a bytes-pair that has several dozen unique values, of which the first most frequent ones have a total probability 99.999%—such a pair is considered suitable with 5 unique values.

Although in the above illustrative embodiments of FIGS. 3 and 4 the bytes of the application header are grouped into four sets of two bytes, other combinations may be employed at the discretion of the implementer, including more or less bits in total, and combining more than two or less than two bytes, or choosing other bitmasks for application header, including different bitmasks for different applications.

Once the statistics are determined, any received packet that does not match the expected values can be suspected as part of an attack, or at best, as carrying some change in a network environment. Thus, for example, with the distribution of FIG. 4, where there are only expected to be 3 unique values in bytes 1 and 2 and so if packets arrive that have various other values in bytes 1 and 2, those uncommon packets may be considered to be suspicious. Uncommon packets, depending on their intensity and recurrence, may turn on the ALARM state and be rejected or result in some change in the limited set of permissible values. It should be noted that the latter option means that learning actually continues all time during the testing phase.

In an embodiment, the matching test is achieved by employing a probabilistic inference engine (PIE), e.g., by detector 111. The probabilistic inference engine consists of multiple probabilistic traps (PT), one PT per destination, where a destination is a combination of destination IP address or an IP subnet and at least one port. Packets which have the same defined destination, which would include packets having different IP addresses that are within the defined subnet and having a port within the defined range for the destination, as in the example of FIG. 4, may use the same PT which thus serves a group of ports for a single destination IP address or subnet. Possible IP address and port combinations that can make up a destination are described further hereinbelow. In an embodiment, each PT is implemented as at least one probabilistic modified Bloom filter (PMBF) and one estimator of the probability of uncommon packets (ups—uncommon per sample). All PMBFs of all PTs share the same set of hash functions, which may be implemented in some embodiments, for example, as a lookup table (LUT) to provide computationally effective hashing. Such a lookup table can contain uniformly distributed random indexes of the PMBF array and is generated only once when the PIE is initialized. For example, if 2 or 3 bytes-pairs are applicable for some destinations, then its respective PT is always one per destination comprising of 2 or 3 PMBFs and 1 common ups estimator.

In its functioning, each PT goes through two stages: an initial learning phase and a testing phase that are done on a per-destination basis. As will be shown hereinbelow, for each PT during the learning phase, several data timeseries containing unsigned integer values formed from UDP payload bits located in places selected by implementer are analyzed, of which only a part will be accepted as suitable. In some embodiments, such locations may be bytes-pairs or sets of individual bits formed by a bitmask that selects, for example, at least 16 bits. Further during the testing phase, only data from accepted locations is analyzed and a PMBF is allocated for each accepted location. All PMBFs of the same PT are associated with a common UPS estimator.

A conventional Bloom filter is a space-efficient data structure that is used to determine whether an element under test is a member of a previously presented data set. A conventional Bloom filter may return false positives, but it will not return false negatives. In one embodiment, the probabilistic modified Bloom filter for each destination, rather than employing a one-dimensional array where each element of the array is a single bit as in a conventional Bloom filter, or even an a one-dimensional array of integer counters, employs a one-dimensional array of floating-point counters.

In a particular example, the bytes of the application header in the UDP payload at particular locations therein are grouped into four groups of two bytes each as described hereinabove, i.e., by grouping the first 2 bytes, i.e., bytes 1 and 2, of the application header into one number, with byte 1 being the most significant bits (MSBs) and byte 2 being the least significant bits (LSBs) of the number. Similarly, grouping the next 2 bytes, i.e., bytes 3 and 4, of the application header into one number, with byte 3 being the MSBs and byte 4 being the LSBs of the number, and so forth for the remaining 4 bytes. Thus, four sets of 16-bit unsigned integers are produced. Each 16-bit unsigned integer number has a possible value from 0 to 65,535. In other embodiments, the bits of the application header may be grouped differently, and then may have value ranges that are different from the specific example described herein.

In one embodiment, a number of hash functions are selected for hashing the value of each of the grouped bytes, which, in this example, are the four 16-bit numbers. The number of hash functions selected is determined in order to achieve an acceptable rate of false positives. For example, according theory, for an optimal Bloom filter of any capacity, a desired false positive rate of $r_{FP}=10^{-4}$ can be achieved with K=14 hash functions where K is determined according to: $K=\lceil -\log_2 r_{FP} \rceil = \lceil -\log_2 10^{-4} \rceil$.

More specifically, when M is the number of counters in the one dimensional array of each modified Bloom filter and N is the number of legitimate values that may appear in the 16-bit number of a grouped pair of bytes and $r_{FP}$ is the maximum acceptable rate of false positives, then minimum acceptable size of Bloom filter array is $M=\lceil KN/\ln 2\rceil=\lceil -N \log_2 r_{FP}/\ln 2\rceil$. For example, if N=10, i.e., there are 10 values that are legitimately expected in a particular byte-pair, i.e., at a particular location in the application header, and $r_{FP}$ is 10-4, then M≥192. If N=12, then, with the same $r_{FP}$=M≥231. Thus, for computational efficiency, M may be set to 256, so that 256 floating point counters are employed in the one-dimensional array for each byte-pair of each destination. The number 'M' and 'N' are preconfigured, and typically integer numbers.

Below, the method will be described generally and in terms of a particular example.

In one embodiment, to effectively obtain results of applying 14 hash functions to the byte-pairs, i.e., to obtain the indices which would otherwise be obtained by the hashing process to the byte-pairs, conventional hashing, i.e., applying a hash function to the byte-pairs, is not performed. Instead, the indices that can be obtained using a hashing process are derived by using a lookup table, which supplies as output the, e.g., 14, index values to be employed for each byte-pair value that is supplied as input thereto. To this end, in such an embodiment, as an initial step that is performed only once prior to the start of the learning phase, one and only one lookup table (LUT) of 8-bit integers is initialized and is to be used for all destinations. Thus, the dimensions of the array are, in a first dimension, the total number of possible values that can be taken by the grouped bytes of the application header and in the other dimension, the number of hash functions K employed. Thus, in the case of 16-bit numbers and 14 hash functions, i.e., K=14, an array $2^{16}\times 14$ of 8-bit values is required. This array is initialized with uniformly distributed random integers having values from 0 to 255, with the goal being to make each row of the array as different as possible from other rows and each row is a combination of unique values. In other words, for every possible 16-bit value there is a row in the table with 14 non-recurring elements initialized to contain uniformly distributed random numbers between 0 and 255. There are 14 elements per row, and each row has a specific element, that it was, stores the result of a particular hash function. In assigning the random numbers, the random numbers for each row must all be different, and they must have an equal probability to exist.

Once the lookup table is initialized the learning phase may begin. During the learning phase, ingress packets are collected to get representative data, e.g., as indicated above, at least several tens of thousands (thumb rule) of UDP packets per desired destination. The statistics are collected on a per destination basis, where a destination is a combination of the destination IP address or IP subnet and at least one port. Thus, for example, a destination may be any one of: a single IP address and single port, a subnet and single port, a single IP address and a range of ports, a subnet and range of ports, an arbitrary list of IP address and ports, and the like. Thus, for example, ingress packets are collected for a time long enough to collect several tens of thousands of packets for each expected destination. The number of packets and the length of time are at the discretion of the implementer. Note that since different destinations typically have different partial traffic rates, the duration of their training phases and the start of the testing phases may differ from each other. Thus, each PT is an independent object.

Figure 5:
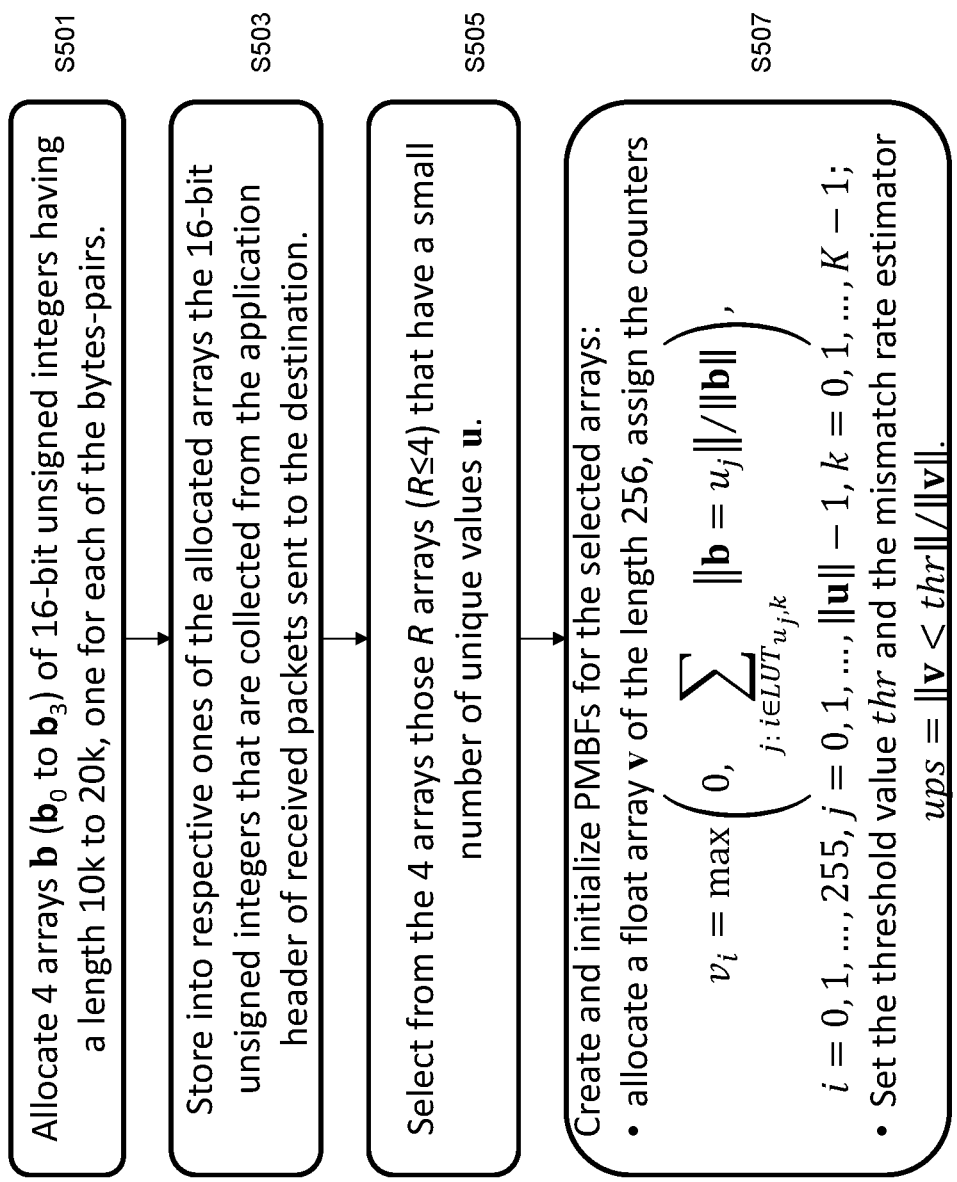
FIG. 5 shows an illustrative flow chart for implementing an embodiment of an initial learning phase in a defense system.

FIG. 5 shows an illustrative flow chart for implementing an embodiment of the initial learning phase. It must be remembered that this process is performed on a per-destination basis, so that even though it is described once, in practice it is performed many times, once for each expected destination. FIG. 5 is generally described herein in terms of the example of the application for utilizing one-dimensional 16-bit unsigned integer arrays, and a first 8 bytes of the UDP payload are grouped into four groups of two bytes as described hereinabove. It should be noted that the number of integer arrays and the number of bytes can be any integer number.

In S501, for each destination, four one-dimensional 16-bit unsigned integer arrays are allocated, and each array having a large enough size to hold all possible values formed in the selected bits received during the learning time window. For heavy-traffic destinations, as an example, the length of each array can be 10-20 thousand or more, and for less active ones—in order to save time and at the cost of loss of sensitivity to rare values—much less. These arrays are designated b, and for the example of 4 byte-pairs, there are 4 arrays b, $b_0$ to $b_3$.

In S503, the 16-bit integers that are collected from the application header of received packets sent to the destination are stored in respective ones of the allocated arrays. Thus, for example, the 16-bit integer from the first two bytes of the received UDP packet is stored in the first of the arrays $b_0$, the 16-bit integer from the second two bytes of the received UDP packet is stored in the second of the arrays $b_1$, the 16-bit integer from the third two bytes of the received UDP packet is stored in the third of the arrays $b_2$, and the 16-bit integer from the fourth two bytes of the received UDP packet is stored in the fourth of the arrays $b_3$.

Once a sufficient number of the packets is collected and the 16-bit integers from each are placed in the proper one of the 4 arrays, the arrays are inspected in S505 to see which ones have only a small number of unique values, i.e., values that have repeated in a high percentage of the packets. R arrays having a small number of unique values are selected (R≤4). Thus, an array is selected when it has $N_u$ unique values $u_j$ where j=0, 1, . . . , $N_u$−1, and e.g., $N_u$≤12.

The maximum number of $N_u$ values that allows an array to be selected is set by the implementer. In one embodiment, the maximal permissible number $N_u$ is 10. Thus, for example, for the destination shown in FIG. 3 the array $b_0$ corresponding to bytes 1 and 2, which only have two unique values as explained hereinabove is selected and the array $b_1$ for bytes 3 and 4 which similarly has two unique values, as explained hereinabove, is also selected. Similarly, for the destination shown in FIG. 4, are selected the array $b_0$ corresponding to bytes 1 and 2, have three unique values, of them only the first two most frequent unique values have to be taken into account, as explained hereinabove, and array $b_1$ corresponding to bytes 3 and 4, which have four unique values, of them only the first most frequent value could be taken into account.

When less than all of the value positions, e.g., less than all 4 of the byte-pairs, have a small number of suitable unique values, only those value positions, e.g., byte-pairs will have probabilistic modified Bloom filters (PMBF) created for them. For each destination it is tracked how many PMBFs are employed and for which value positions, e.g., byte-pairs, they respectively correspond.

Thereafter, for each of the arrays selected in S505, a PMBF, is created and then initialized in S507 as follows. First, for the example being discussed, a one-dimensional array of floating-point numbers to be used as counters is created, the array having a length of 256, where the index into the counters is i ranging from 0 to 255. Each of the counters is assigned an initial value $v_i$=max (0, $\Sigma_{j:i\in LUT_{uj,k}}\|b=u_j\|b=u_j\setminus\|b\|)$, where i=0, 1, . . . , 255, j=0, 1, . . . , $N_u$–1, k=0, 1, . . . , K–1, $N_u$=∥u∥ is a number of selected unique values, and ∥b∥ is the set size. That is, the total number of samples collected in the particular array b, which is the length of each array b and which. For the example mentioned above, the length of each array b may be about several tens of thousands, and ∥b=$u_j$∥ is the frequency of the distinct value $u_j$, which is one of the small number of unique values, that appeared in the particular array b, K is a number of hash indices, e.g., 14, and LUT is the lookup table containing uniformly distributed random numbers 0 to 255 initialized prior to the process shown in FIG. 5.

Thus, there will be at most $KN_u$ elements in a PMBF array that have a substantial value, and since we selected positions in UDP payload which form a small value $N_u$, this allows to use a small PMBF to effectively detect uncommon samples. A threshold thr is set as follows: thr takes a value, e.g., between 0.01 . . . 0.2 as selected by the implementer based on an acceptable rate of uncommon packets. Also, the mismatch rate estimator, also known as the uncommon per sample (ups) estimator, is initialized as follows: ups=∥v<thr∥\∥v∥ where ∥v∥ is the size of the PMBF, i.e., the number of values in the Bloom filter array, e.g., 256, and ∥v<thr∥ is the number of counters whose values are less than threshold thr. Every PMBF maintains its own uncommon per sample (ups) estimator. Uncommon per sample estimator provides a probability estimate, the value of which is updated as the testing process progresses.

The PMBFs created for a destination, together with the ups estimator, may be considered to be the PT for that destination.

Once the learning phase is complete, the process moves to the testing phase.

Figure 6:
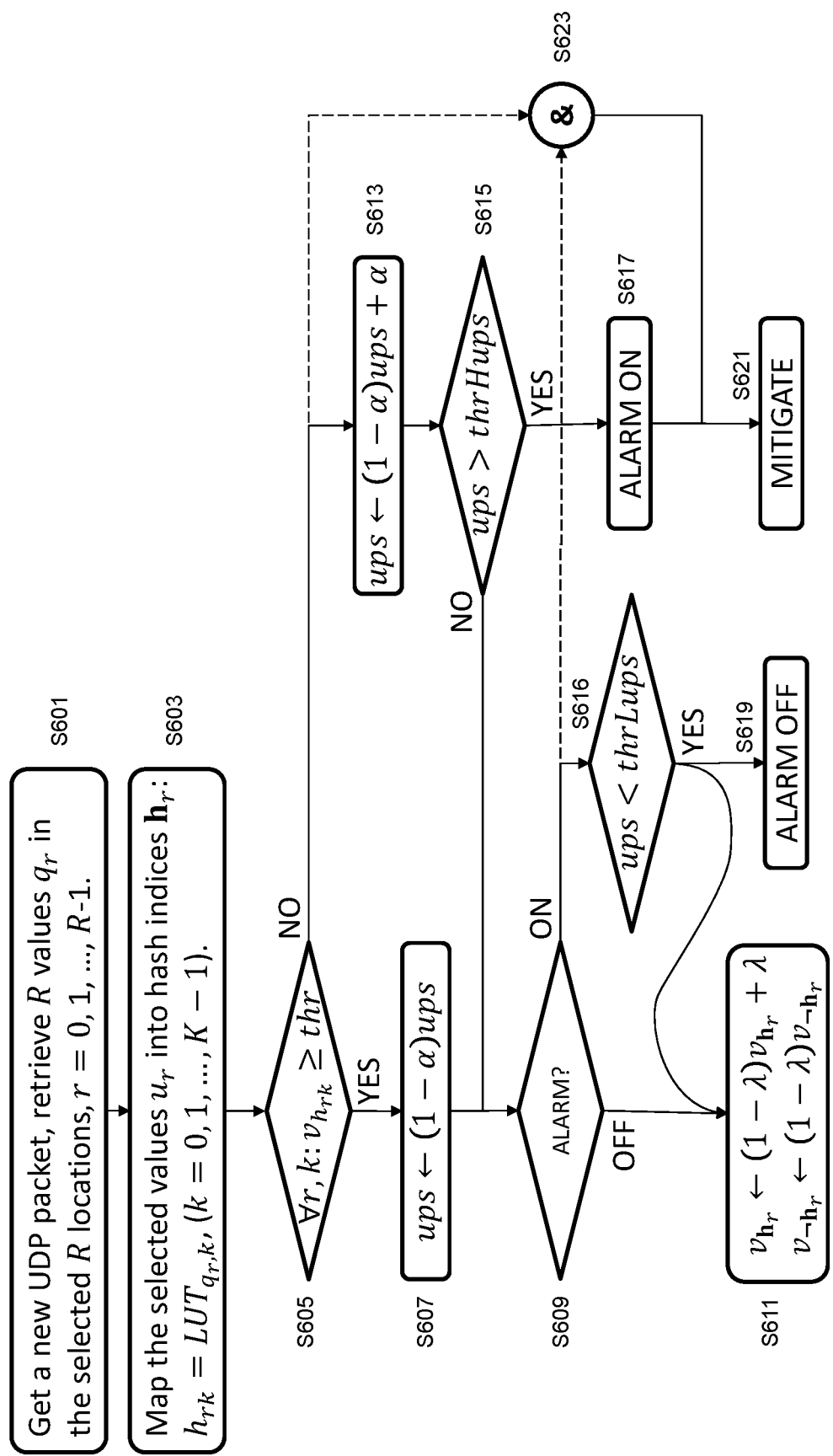
FIG. 6 shows a flowchart of an illustrative process for implementing a testing phase in a defense system.

FIG. 6 shows an illustrative flowchart for implementing an embodiment of the testing phase. FIG. 6 is generally described herein in terms of the example of the application utilizing 4 bytes-pairs and 14 hashes on the value in the byte-pair. However, it should be noted that the number of integer arrays and the number of bytes can be any integer number.

In the testing phase, for each received UDP packet, the designated values, formed, as described hereinabove, in specific locations of the UDP payload by predetermined bitmasks, in particular by bytes-pairs, are hashed into PMBF indices that point to specific counters in the PMBF for that destination and location. Although only 4 bytes-pairs are referred hereinafter for illustration and ease of elucidation, this is fully true for any set of sized enough bitmasks of arbitrary composition, for example, a bitmask selecting 16-20 odd or even bits. In the example above, there are four bytes-pair values employed per destination. The total number of suitable and applicable byte-pairs may be referred to herein as R and each particular byte-pair is pointed to by a pointer, also known as an index, r, r=0 to R−1; in examples of the FIGS. 3-4 where only two bytes-pairs were chosen, R=2. In one embodiment, each received value formed by bytes-pair may be hashed by each of a set of hash functions. Thus, in the example above, each of the two chosen byte-pairs are hashed by each of 14 hash functions of a set of 14 hash functions to produce 14 indices for each bytes-pair.

Alternatively, to ease the computational burden, in accordance with an aspect of the disclosure, instead of using 14 hash functions the hashing effect may be achieved by using the lookup table LUT, as described in more detail hereinbelow.

The values of the counters pointed to by each resulting index in the array for each byte-pair, whether determined by regular hashing or by using the lookup table LUT, are checked for a match, and the ups estimator is updated in a manner that is based on whether a match is found or not.

If the value of ups exceeds its upper threshold thrHups, the ALARM state is switched on, the counter values are frozen, and all unmatched packets are rejected. Otherwise, if the ups value is below its lower threshold thrLups, the ALARM state is switched off, and the counters are updated.

In the testing phase, the process begins in S601 when a new sample is received, i.e., a new UDP packet having a UDP application header is received. The selected R values $q_r$, taken from the R locations defined in the initial learning phase (S505), r=0, 1, . . . , R−1, where R≤4 i.e., the values of at most the four byte-pairs, are obtained from the UDP application header.

In S603, each of the selected values $q_r$ is effectively hashed into K-elements vector of indexes to the PMBF array. In one illustrative embodiment, each value is actually hashed using each of the hash functions, e.g., 14 hash functions, to produce indexes i, one index for each hash function for each value. Per the example of such an embodiment, each of the at most 4 byte-pairs is hashed by 14 different hash functions to produce 14 indices for each byte-pair value.

However, as indicated above, in another embodiment, in lieu of actually performing 14 hashes on the value in the byte-pair, which can be computationally expensive, to produce the 14 indexes, each of which corresponds to a hashing of the value of the byte-pair, indexes are obtained by effectively hashing the value in the byte-pair by employing lookup table LUT that would have been initialized prior to beginning the testing phase and even possibly prior to beginning the learning phase. Note that such a lookup table LUT has one row corresponding to each possible value obtainable from the UDP application header, e.g., when the values are formed from byte-pairs, there are 16 bits and hence in a lookup table LUT there can be 65,536 rows as the byte-pair values can range from 0 to 65,535.

Each row of LUT has a number of values equal to the number of hash functions being effectively simulated. Thus, for the example of 14 hash functions there are 14 values in each row, i.e., each row is a one-dimensional array, also referred to as a hash vector, with 14 elements. The 14 values of the row corresponding to the value $q_r$ formed by the r-th byte-pair is obtained and these 14 values are used as, and considered to be, the hash vector $h_r$ for the retrieved byte-pair value. This can be represented as $h_{rk}$=$LUT_{q_r,k}$, k=0, 1, . . . , K−1, where $h_{rk}$ is the k-th index of the vector $h_r$ used to point to the counter with the serial number $h_{rk}$ in the r-th PMBF of the PT for the destination of the received UDP packet.

Next, in S605 it is determined if $\forall \sigma_{h_{rk}} \geq$ thr, i.e., is the value of every counter pointed to by one of the indexes, hashed from the R derived values, not less than a prescribed threshold. In other words, S605 checks whether all R values derived from the selected byte-pairs, are likely, but not guaranteed, have been seen and recognized before and belong to the small set of values that should appear in the byte-pairs that were selected in the initial learning phase.

If the test result in S605 is YES, indicating that all R values retrieved in the R selected locations are recognized, control passes to S607 in which the ups estimate common to all R PMBFs belonging to this PT decreases with a factor (1−α), where 0<α≫1 is a fading parameter of the ups estimate. The recommended value for α is about 0.01 of the normal the ups estimate value, e.g., 0.0001 if the implementer assumes that about 1% of packets will be uncommon. As will be shown hereinbelow, S607 and S613 work together as an IIR LPF (infinite impulse response lowpass filter) to smooth out changes in the ups value.

Thereafter, at a conditional fork point S609, processing continues depending on the current state: if it is set to ALARM OFF, then control passes to point S611, in which the values of all counters of all R PMBFs are updated. More specifically, each of K counters that are being pointed by hash vector $h_r$ increases by a small value $\lambda(1-v_i)$ that depends on its current value $v_i$: $v_{h_{rk}} \leftarrow 1-\lambda)v_{h_{rk}}+\lambda$, while the remaining M-K counters that are not being pointed by hash vector $h_r$ decreases by a small value $\lambda v_i$ that also depends on its current value $v_i$: $v_{\neg h_{rk}} \leftarrow (1-\lambda)v_{\neg h_{rk}}$, where $0<\lambda<\!\!<1$ is a fading parameter of the PMBF counters, M=256 is the length of the PMBF array, and "¬" is the negation operator to designate the counters that are not hit.

It can be shown that the above formulas of step S611 (as well as S607 with S613) make counters to be probability estimates of hitting them, so the modification of the Bloom filter used here is named "probabilistic". Indeed, let p be the probability of hitting the i-th counter. Thus, after a next hit its persistent time-averaged value $<v_i>=(1-p)[(1-\lambda)<v_i>]+p[(1-\lambda)<v_i>+\lambda]=<v_i>+\lambda(p-<v_i>)$, which means that $<v_i>=p$ for any $\lambda$. In other words, time-average of any counter estimates the probability that a hash vector points to it. Similarly, the ups value estimates the probability of uncommon packets occurring in the destination.

If the test result in S609 is ON, indicating that the ALARM ON state is set, then control passed to conditional branch point S616, where it is checked whether the ups value is less than the lower threshold thrLups of the ALARM ON state. If the result is positive, ALARM OFF state is set (S619), and control passes to the already familiar point S611, where all counters are updated.

If the test result in S605 is NO, indicating that at least one of the counters pointed to by the hash vectors in all PMBFs allocated for the PT being dealt with is less than the threshold value thr, then control proceeds to S613 in which the ups value is increased as follows: ups←(1−α)ups+α. Again, note that the ups value estimates the probability of occurring of uncommon packets and serves as an indicator of switching ALARM state ON and OFF for specific destination. Thus, receiving of a new uncommon UDP packet increases the probability estimate of uncommon UDP packets. Each uncommon UDP packet may be part of an attack, or, as noted hereinabove, may show some occasional wrong values, or new emerging values that need to be kept.

Thereafter, control passes to conditional branch point S615, where it is checked whether the ups value exceeds the upper threshold thrHups of the ALARM ON state. If the result is positive, the ALARM ON state is set (S617), followed by the mitigation action (S621) for all uncommon UDP packets and a complete update freeze for all counters of all PMBFs of this PT at point S611 for all UDP packets, including recognized ones, destined for the destination being processed, for as long as the ALARM ON state continues. This freezing is controlled by conditional branch point S609, and the logical AND-node S623 ensures mitigation of all UDP packets that were determined as uncommon in step S605 during the ALARM ON state verified at the conditional branch point S609.

If S615 results with a NO, i.e., the ups value does not exceed the upper threshold thrHups, control passes to conditional branch point S609 to check the current ALARM state. Depending on the result of this checking, control passes similarly as it was explained above: if the ALARM state is set to OFF, control passes to point S611 for updating all counters, and if the ALARM state is set to ON control there is no sense to check the increased in S613 value of ups at conditional branch point S616, and via logical AND-node S623, control passes to S621 to perform a mitigation action as described hereinabove.

The process exits for the current UDP packet after execution of either S611, S619, or S621, followed by network processing of only those UDP packets that passed S611.

Figure 7:
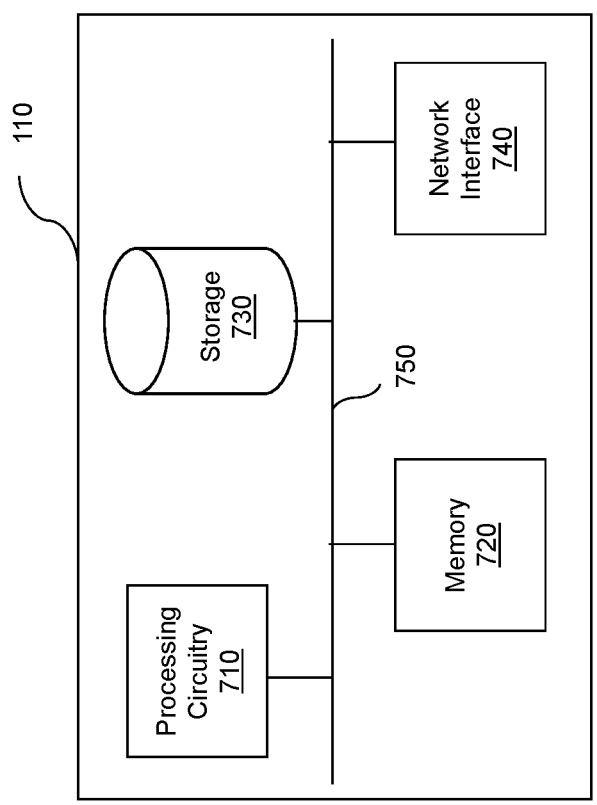
FIG. 7 shows an illustrative schematic of the defense system of FIG. 1 according to an embodiment.

FIG. 7 shows an illustrative schematic of defense system 110 according to an embodiment. Defense system 110 should be capable of processing packets at a high rate of speed commensurate with the anticipated demands of network traffic, and more importantly perhaps, be able to handle in real-time the high-speed traffic onslaught that may result from an attack.

Defense system 110 includes processing circuitry 710 coupled to memory 720, storage 730, and network interface 740. In an embodiment, the components of the defense system 110 may be communicatively connected via a bus 750.

Processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

Memory 720 may be volatile, e.g., random access memory, etc., non-volatile, e.g., read only memory, flash memory, etc., or a combination thereof.

In one configuration, software for implementing one or more embodiments disclosed herein may be stored in storage 730. In another configuration, memory 720 is configured to store such software. Software shall be construed broadly to mean any type of instructions, whether referred to as software, firmware, middleware, microcode, hardware description language, or otherwise. Instructions may include code, e.g., in source code format, binary code format, executable code format, or any other suitable format of code. The instructions, when executed by processing circuitry 710, cause processing circuitry 710 to perform the various processes described herein.

Storage 730 may be magnetic storage, optical storage, and the like, and may be realized, for example, as flash memory or other memory technology, compact disk-read only memory (CD-ROM), Digital Video Disks (DVDs), Solid State Drive (SSD), or any other medium which can be used to store the desired information.

Network interface 740 allows the system 110 to communicate with, for example, client 120, attack tool 125, and victim server 130.

It should be understood that the embodiments described herein are not limited to the specific architecture illustrated in FIG. 7, and other architectures may be equally used without departing from the scope of the disclosed embodiments. Furthermore, defense system 110 as shown in FIG. 7 may implement both detector 111 and mitigation resource 112 which are implemented by respective and cooperating software executing on processing circuitry 710.

The various embodiments disclosed herein can be implemented as hardware, firmware, firmware executing on hardware, software, software executing on hardware, or any combination thereof. Moreover, the software is implemented tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be implemented as either part of the microinstruction code or, part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

The following merely illustrates the principles of the invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting a denial of service (DoS) attack when packets used in the DoS attack are user datagram protocol (UDP) packets, the method comprising:
    obtaining values from an application header of a UDP packet; and
    when, based on use of at least one modified probabilistic Bloom filter (PMBF) for a destination to which the UDP packet indicates that it is destined, the obtained values are not values expected to be found in a UDP packet destined for the destination:
        increasing an uncommon per sample (ups) estimate for the PMBF; and
        when the increased uncommon per sample estimate is greater than an upper ups threshold:
            setting an alarm state to on;
            suspending update of the PMBF counters; and
            initiating a mitigation action at least with respect to the UDP packet.

2. The method of claim 1, wherein the destination to which the UDP packet indicates that it is destined is a combination of a destination IP address of the UDP packet and a port specified in the UDP packet.

3. The method of claim 1, wherein the at least one PMBF is a pretrained PMBF that was trained during an initial learning phase as to which values are expected to be found in particular locations of a UDP packet destined for the destination.

4. The method of claim 1, further comprising effectively hashing at least one of the obtained values to produce resulting hash values and the resulting hash values are used as indices to point to counters of the PMBF.

5. The method of claim 4, wherein effectively hashing comprises hashing at least one of the obtained values using at least one hash function to produce at least one of the resulting hash values.

6. The method of claim 4, wherein effectively hashing comprises obtaining at least one index to point to counters of the PMBF from a lookup table, wherein the at least one index is obtained from a row of the lookup table corresponding to the obtained value.

7. The method of claim 6, wherein the lookup table has a row for each possible obtained value and a column for each of the at least one index to be provided by the lookup table.

8. The method of claim 6, wherein a single lookup table is jointly employed for every PMBF and the lookup table is prepopulated with uniformly distributed random integer values ranging from 0 to 255, wherein the random integer values are distributed so to as to make a row of the lookup table comprises of different values only and a row is a unique set of values.

9. The method of claim 1, wherein obtaining values from an application header of a UDP packet further comprises:
    grouping 'b' bits of a UDP payload into 'b/2' bytes-pairs, wherein the bytes-pairs are formed by a bitmask process, the application header of the UDP packet is the UDP payload.

10. The method of claim 9, wherein the at least one PMBF comprises a predefined number of counters.

11. The method of claim 10, wherein each of the counters is a floating-point counter.

12. The method of claim 11, wherein the obtained values are effectively hashed to produce a resulting hash vector and each respective element of the resulting hash vector is used as an index to point to one of the counters of the at least one PMBF.

13. The method of claim 1, wherein when, based on use of all PMBF for the destination to which the UDP packet indicates that it is destined, the obtained values are indicated to be values expected to be found in specific locations of a UDP packet destined for the destination:
    decreasing the ups value for the destination;
        if the ups value is beneath the lower threshold, setting the alarm state to off; and
        updating values of the PMBF.

14. The method of claim 13, wherein obtaining values from an application header of a UDP packet further comprises:
    grouping 'b' bits of a UDP payload into 'b/2' bytes-pairs, wherein the bytes-pairs are formed by a bitmask process, the application header of the UDP packet is the UDP payload.

15. The method of claim 14, wherein each PMBF comprises a predefined number of counters.

16. The method of claim 15, wherein each of the predefined number of counters is a floating-point counter.

17. The method of claim 16, further comprising:
    effectively hashing at least one of the obtained values to produce a hash vector comprising a predefined number of resulting values and each respective resulting value is used as an index to point to one of the counters of the at least one PMBF.

18. The method of claim 17, wherein values of the at least one PMBF are values of the counters of the at least one PMBF and wherein updating the values of the PMBF further comprises:
    increasing the value of each counter of the at least one PMBF pointed to by a hash vector; and
    decreasing the value of each counter of the at least one PMBF not pointed to by a hash vector.

19. A device for detecting a denial of service (DoS) attack when packets used in the DoS attack are user datagram protocol (UDP) packets comprising:
    one or more processors configured to:
        obtain values from an application header of a UDP packet; and
        when, based on use of at least one modified probabilistic Bloom filter (PMBF) for a destination to which the UDP packet indicates that it is destined, the obtained values are not values expected to be found in a UDP packet destined for the destination:
    increase an uncommon per sample (ups) estimate for the PMBF; and
    when the increased uncommon per sample estimate is greater than an upper ups threshold:
        set an alarm state to on
        suspend update of the PMBF counters; and
        initiate a mitigation action at least with respect to the UDP packet.

20. A non-transitory computer-readable medium storing a set of instructions for detecting a denial of service (DoS) attack when packets used in the DoS attack are user datagram protocol (UDP) packets, the set of instructions comprising:
    one or more instructions that, when executed by one or more processors of a device, cause the device to:
        obtain values from an application header of a UDP packet; and
        when, based on use of at least one modified probabilistic Bloom filter (PMBF) for a destination to which the UDP packet indicates that it is destined, the obtained values are not values expected to be found in a UDP packet destined for the destination:
    increase an uncommon per sample (ups) estimate for the PMBF; and
    when the increased uncommon per sample estimate is greater than an upper ups threshold:
        set an alarm state to on
        suspend update of the PMBF counters; and
        initiate a mitigation action at least with respect to the UDP packet.

* * * * *